United States Patent Office 3,213,090
Patented Oct. 19, 1965

3,213,090
v-TRIAZINO-[5,4-d]-PYRIMIDINES
Josef Roch, Biberach an der Riss, Germany, assignor to Boehringer Ingelheim G.m.b.H., Ingelheim (Rhine), Germany, a corporation of Germany
No Drawing. Filed June 16, 1964, Ser. No. 375,655
Claims priority, application Germany, Feb. 2, 1960, T 17,822
11 Claims. (Cl. 260—246)

This is a continuation-in-part of copending application Serial No. 267,906, filed March 26, 1963, now abandoned, which in turn is a continuation-in-part of application Serial No. 87,483, filed January 31, 1961, now abandoned.

This invention relates to v-triazino-[5,4-d]-pyrimidines, their tautomers, salts of the v-triazino-[5,4-d]-pyrimidines and salts of the tautomers, as well as to various methods of preparing each of these compounds.

More particularly, the present invention relates to compounds selected from the group consisting of v-triazino-[5,4-d]-pyrimidines of the formula

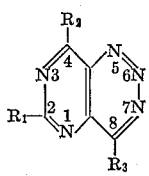

(I)

wherein $R_1$, $R_2$ and $R_3$ are each selected from the group consisting of hydrogen, hydroxy, halogen, lower alkoxy, (di-lower alkyl-amino)-lower alkoxy, phenoxy, mercapto, lower alkyl-mercapto, benzyl-mercapto, phenyl-mercapto, lower alkyl-hydrazino and basic substituents of the formula

wherein $R_4$ and $R_5$ are selected from the group consisting of hydrogen, lower alkyl, lower alkenyl, hydroxy-lower alkyl, phenyl, benzyl, and, together with each other and the adjacent nitrogen atom, basic heterocycles selected from the group consisting of morpholino, pyrrolidino, piperidino, hexamethyleneimino, N'-lower alkyl-piperazino, lower alkyl-piperidino, hydroxy-piperidino, lower alkyl-morpholino, and tetrahydro-pyridino, their tautomers of a formula selected from the group consisting of

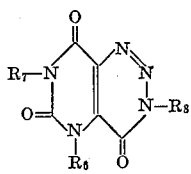

(Ia)

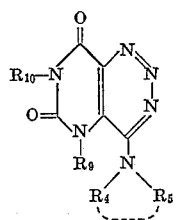

(Ib)

and

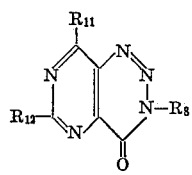

(Ic)

wherein
$R_4$ and $R_5$ have the meanings previously defined,
$R_6$ and $R_7$ are each selected from the group consisting of hydrogen, lower alkoxy-lower alkyl, lower alkenyl, phenyl and benzyl,
$R_8$, $R_9$ and $R_{10}$ are each selected from the group consisting of hydrogen, lower alkyl, lower alkoxy-lower alkyl, lower alkenyl, phenyl and benzyl, and
$R_{11}$ and $R_{12}$ are each selected from the group consisting of hydrogen, halogen, lower alkoxy, (di-lower alkyl-amino)-lower alkoxy, phenoxy, mercapto, lower alkyl-mercapto, benzyl-mercapto, phenyl-mercapto, lower alkyl-hydrazino and

wherein $R_4$ and $R_5$ have the meanings previously defined, salts of said v-triazino-[5,4-d]-pyrimidines and salts of said tautomers.

The v-triazino-[5,4-d]-pyrimidines according to the present invention, that is, those embraced by Formula I above and their salts, may conveniently be prepared by reacting a pyrimidine-carboxylic acid-(4)-derivative of the formula

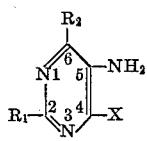

(II)

wherein $R_1$ has the same meanings as in Formula I and $R_2$ has also the same meanings as in Formula I except free or mono-substituted amino, and X is an unsubstituted or substituted amide, thioamide or amidine group, with a diazotizing agent.

The reaction of the pyrimidine-carboxylic acid-(4) compound of the Formula II with the diazotizing agent is advantageously carried out in the presence of an inert solvent or diluent and while cooling; the reaction temperature is preferably between 0 and 10° C.

The diazotizing agent is nitrous acid furnished by inorganic as well as organic compounds forming nitrous acid under the reaction conditions. Examples of such nitrous acid yielding compounds are alkali metal nitrites or esters of nitrous acid. Examples of suitable solvents or diluents are dilute or concentrated mineral acids, or organic solvents such as lower alkanols, formic acid, ethyl acetate, dioxane and dimethylformamide. If the reaction is performed with esters of nitrous acid in organic solvents, catalytic amounts of concentrated mineral acid are added to the reaction mixture.

Those v-triazino-[5,4-d]-pyrimidines of the Formula I above wherein one, two or all three of substituents $R_1$, $R_2$ and $R_3$ are hydroxyl, also exist in the form of their corresponding oxo-tautomers. For instance, if $R_1$ is a hydroxyl group, the corresponding oxo-tautomers have the formula

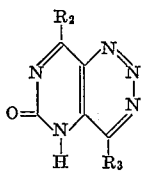

Similarly, if both $R_1$ and $R_2$ are hydroxyl, the corresponding dioxo-tautomers have the formula

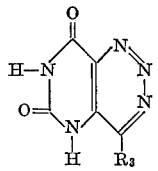

and if $R_1$, $R_2$ and $R_3$ are all hydroxyl, the corresponding trioxo-tautomer has the formula

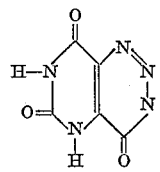

In the event that the reaction between compound II and the diazotizing agent yields a compound of the Formula I which contains one or more hydroxyl substituents, this hydroxyl-substituted v-triazino-[5,4-d]-pyrimidine may, if desired, subsequently be alkylated or aralkylated by customary methods. Under these circumstances the hydroxy-substituted v-triazino-[5,4-d]-pyrimidines react in their tautomeric form, so that the substitution takes place at one or more of the ring nitrogen atoms adjacent to the oxo group. This reaction is best carried out in a weakly alkaline medium at room temperature or slightly elevated temperatures by means of the customary alkylating or aralkylating agents, such as dimethyl sulfate, alkyl iodides, β-chloroethanol, allyl chloride, benzyl chloride or the like.

If substituents $R_1$, $R_2$ and $R_3$ in the v-triazino-[5,4-d]-pyrimidines according to the present invention have the meanings defined above in connection with Formula I, except alkyl, aryl and aralkyl, they may also be transformed by known methods into other types of substituents, if desired. For instance, a hydroxyl group may be replaced by halogen or a mercapto group; or halogen may be exchanged for basic substituents, free or substituted mercapto or hydroxyl groups; similarly, free or substituted hydroxyl or mercapto groups may be replaced by basic substituents, and one type of basic substituent may be replaced by another type of basic substituents.

For instance, the replacement of hydroxyl groups by free mercapto groups is effected by means of phosphorus pentasulfide, and the introduction of a halogen as a ring substituent is advantageously effected by means of a halogenation reaction with halogenating agents, such as halides of phosphoric acid.

The replacement of the halogen by basic groups, or free or substituted mercapto and substituted hydroxyl groups can be effected by reaction with the corresponding bases, mercapto or hydroxyl compounds.

The exchange of free or substituted hydroxyl or mercapto groups for basic substituents is accomplished in the same manner as the replacement of the halogen by reaction with the corresponding bases. However, somewhat more severe reaction conditions are generally required for this exchange, such as more extended heating or higher temperatures or the application of elevated pressures, etc.

Depending upon the substituents present in the compounds of the Formula I, a variety of salts thereof may be prepared. For example, if the substituents include free hydroxyl or mercapto groups, it is possible to form salts with basic compounds. If the substituents contain basic groups, it is possible to form salts with organic and inorganic acids.

The 5-amino-pyrimidine-carboxylic acid-(4) derivatives of the Formula II, which are used as starting materials for the compounds of the present invention, may be prepared in customary fashion. For instance, they may be prepared from free pyrimidine-(4)-carboxylic acids; the amino group in the 5-position may, if necessary, be introduced subsequent to the other substituents. Halogenated compounds of the Formula II are most conveniently prepared by halogenation of the corresponding hydroxylated compounds. By exchange of the halogen, in turn, it is possible to introduce also other types of substituents $R_1$ and $R_2$ within the scope of the above definition.

Specific examples of 5-amino-pyrimidine-(4-)-carboxylic acid derivatives which may be used as starting materials for the preparation of the compounds according to the present invention are the following:

2,6-dipyrrolidino-5-amino-pyrimidine-carboxylic acid-(4)-amide
2-diethanolamino-6-(3'-hydroxy-piperidino)-5-amino-pyrimidine-carboxylic acid-(4)-amide
2-(2'-methyl-morpholino)-6-methylethanolamino-5-amino-pyrimidine-carboxylic acid-(4)-propylamide
2-methylamino-6-dibenzylamino-5-amino-pyrimidine-carboxylic acid-(4)-amide
2-(N'-methyl-piperazino)-6-hexamethyleneimino-5-amino-pyrimidine-carboxylic acid-(4)-methylamide
2,6-dibenzylmercapto-5-amino-pyrimidine-carboxylic acid-(4)-amide
2-methylmercapto-5-amino-pyrimidine-carboxylic acid-(4)-thioamide
2,6-diethoxy-5-amino-pyrimidine-carboxylic acid-(4)-amide
2-(β-diethylamino-ethoxy)-6-diethylamino-5-amino-pyrimidine-carboxylic acid-(4)-amide
2-methyl-5-amino-pyrimidine-carboxylic acid-(4)-benzylamide
2,6-dichloro-5-amino-pyrimidine-carboxylic acid-(4)-amide
2-chloro-6-morpholino-5-amino-pyrimidine-carboxylic acid-(4)-amide
2,6-dihydroxy-5-amino-pyrimidine-carboxylic acid-(4)-(γ-methoxypropylamide)
2,6-dihydroxy-5-amino-pyrimidine-carboxylic acid-(4)-(β-hydroxyethylamide)

The following examples illustrate representative members of the class of compounds contemplated by the present invention and methods for their preparation. It will be understood, however, that the invention is not limited to these examples.

EXAMPLE 1

*2,4-dimorpholino-8-hydroxy-v-triazino-[5,4-d]-pyramidine*

A solution of 0.5 gm. (about 0.007 mol) of sodium nitrite in 10 cc. of water was slowly added dropwise to a solution of 2.0 gm. (0.0065 mol) of 2,6-dimorpholino-5-amino-pyridimidine-carboxylic acid-(4) amide (M.P. 248–250° C.) in about 80 cc. of 0.5 N hydrochloric acid, accompanied by stirring and by cooling to maintain the reaction mixture at a temperature between 0 and 10° C. After all of the sodium nitrite solution had been added, the reaction mixture was allowed to stand for two hours at room temperature, was then neutralized with concentrated ammonia and thereafter was allowed to stand for several more hours at room temperature. The reaction product separated out in the form of a brownish crystalline percipitate, which was separated by vacuum filtration, washed and dried. The yield of raw product was 1.0 gm. (48% of theory). For purification, the raw product was dissolved in dimethylformamide and repricipitated therefrom by adding methanol to the solution. A virtually colorless microcrystalline powder (small fibers) was obtained, which had a melting point of 278–279° C.

Tautomeric formulas:

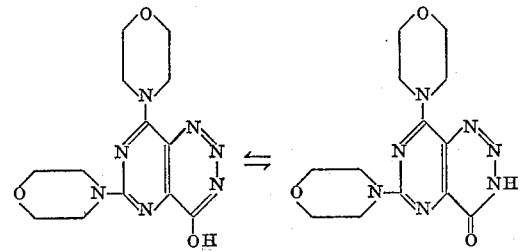

Analysis ($C_{13}H_{17}N_7O_3$): Molecular weight 319.3. Calculated: C, 48.90%; H, 5.37%. Found: C, 48.90%; H, 5.77%.

The same compound was obtained when the above reaction was performed in dioxanesolution instead of water and isoamylnitrite was used as the diazotizing agent (with addition of a few drops of concentrated hydrochloric acid) instead of sodium nitrite. Recrystallized from isopropanol, the reaction product had a melting point of 279–281° C.

Using a procedure analogous to that described above, the following 8-hydroxy-substituted v-trianzino-[5,4-d]-pyrimidines were also prepared:

(a) 2,4 - bis - (dimethylamino) - 8 - hydroxy - v-triazino-[5,4-d]-pyrimidine, M.P. 272–273° C.,

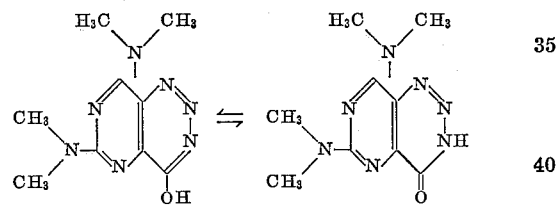

from sodium nitrite and 2,6-bis-(dimethylamino)-5-amino-pyrimidine-carboxylic acid-(4)-amide.

(b) 2 - morpholino - 4 - piperidino - 8 - hydroxy - v-triazino-[5,4-d]-pyrimidine, M.P. 264–265° C.,

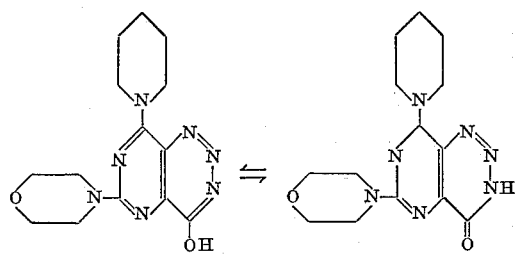

from sodium nitrite and 2-morpholino-5-amino-6-piperidino-pyrimidine-carboxylic acid-(4)-amide.

(c) 2,4 - bis - (N' - methyl - piperazino) - 8 - hydroxy-v-triazino-[5,4-d]-pyrimidine, M.P. 255–257° C.,

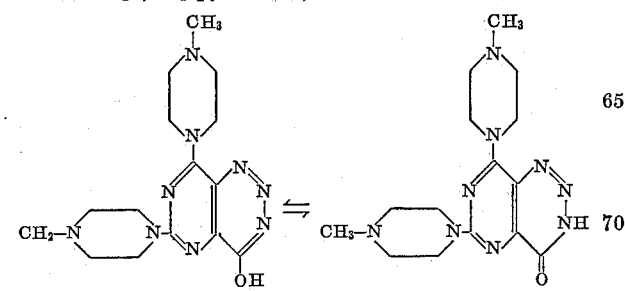

from sodium nitrite and 2,6-bis-(N'-methyl-piperazino)-5-amino-pyrimidine-carboxylic acid-(4)-amide.

(d) 2 - methylamino - 4 - hexamethyleneimino - 8-hydroxy-v-triazino-[5,4-d]-pyrimidine, M.P. 255–257° C.,

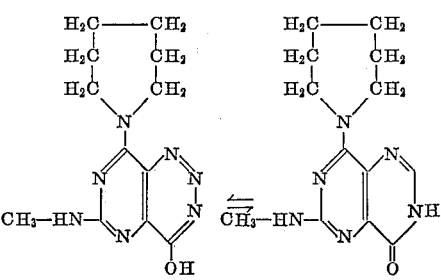

from sodium nitrite and 2-methylamino-5-amino-6-hexamethyleneimino-pyrimidine-carboxylic acid-(4)-amide.

(e) 2 - benzylamino - 4 - piperidino - 8 - hydroxy - v-triazino-[5,4-d]-pyrimidine, M.P. 258–259° C.,

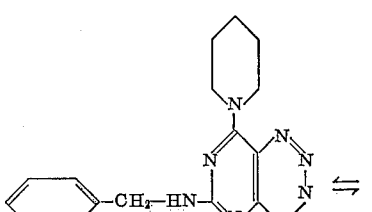

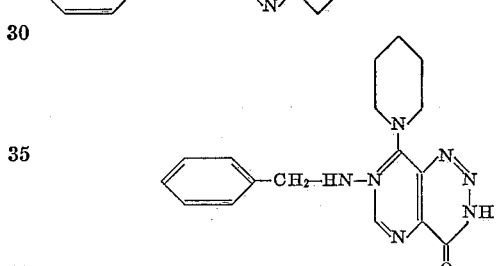

from sodium nitrite and 2-benzylamino-5-amino-6-piperidino-pyrimidine-carboxylic acid-(4)-amide.

(f) 2 - (N - methyl - anilino) - 4 - pyrrolidino - 8-hydroxy-v-triazino-[5,4-d]-pyrimidine, M.P. 256–258° C.,

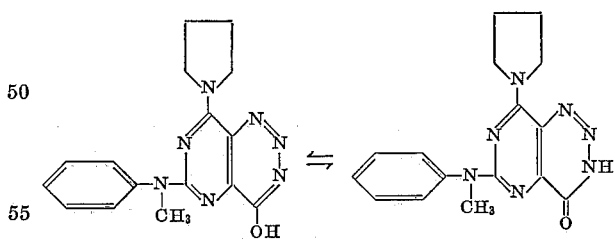

from sodium nitrite and 2-(N-methyl-anilino)-5-amino-6-pyrrolidino-pyrimidine-carboxylic acid-(4)-amide.

(g) 2 - anilino - 4 - piperidino - 8 - hydroxy - v - triazino-[5,4-d]-pyrimidine, M.P. 262–264° C.,

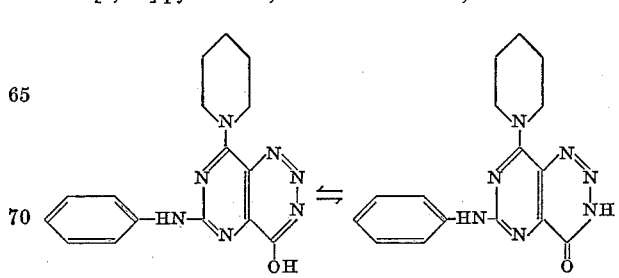

from sodium nitrite and 2-anilino-5-amino-6-piperidino-pyrimidine-carboxylic acid-(4)-amide.

(h) 2 - morpholino - 4 - piperidino - 7 - ethyl - 8 - oxo-dihydro-v-triazino-[5,4-d]-pyrimidine, M.P. 234–235° C.,

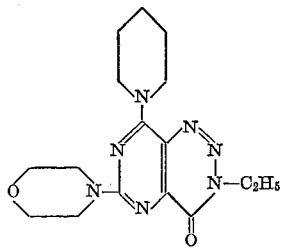

from sodium nitrite and 2-morpholino-5-amino-6-piperidino-pyrimidine-carboxylic acid-(4)-amide, and alkylation of the reaction product with ethyl iodide.

(i) 2,4 - dipiperidino - 7 - n - propyl - 8 - oxo - dihydro-v-triazino-[5,4-d]-pyrimidine, M.P. 109–111° C.,

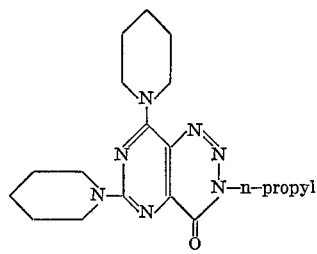

from sodium nitrite and 2,6-dipiperidino-5-amino-pyrimidine-carboxylic acid-(4)-amide, and alkylation of the reaction product with n-propyl-iodide.

(j) 2,4-dipiperidino-7-(τ-methoxy-n-propyl)-8-oxo - dihydro-v-triazino[5,4-d]-pyrimidine, M.P. 133–135° C.,

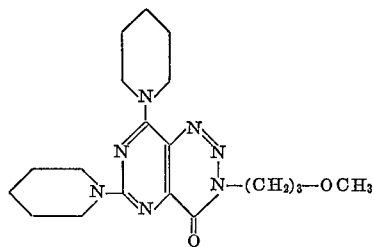

from sodium nitrite and 2,6-dipiperidino-5-amino-pyrimidine-carboxylic acid-(4)-amide, and alkylation of the reaction product with τ-methoxy-n-propyl-iodine.

(k) 2,4-dipiperidino-7-isoamyl-8-oxo-dihydro - v - triazino-[5,4-d]-pyrimidine, M.P. 128–130° C.

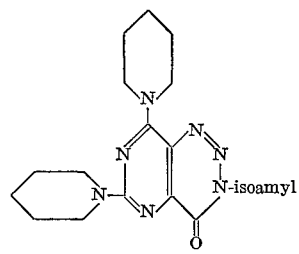

from sodium nitrate and 2,6-dipiperidino-5-amino-pyrimidine-carboxylic acid-(4)-amide, and alkylation of the reaction product with isoamyl iodide. The same compound was obtained from sodium nitrite and 2,6-dipiperidino-5-amino-pyrimidine-carboxylic acid - (4) - isoamylamide.

(l) 2,4-dipyrrolidino-7-n-propyl-8-oxo-dihydro-v - triazino-[5,4-d]-pyrimidine, M.P. 189–190° C.,

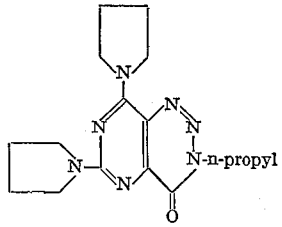

from sodium nitrite and 2,6-dipyrrolidino-5-amino-pyrimidine-carboxylic acid-(4)-amide, and alkylation of the reaction product with n-propyl iodide.

EXAMPLE 2

*2,4-dipiperidino-8-hydroxy-v-triazino-[5,4-d]-pyrimidine*

A solution of 0.7 gm. (0.01 mol) of sodium nitrite in about 1 cc. of water was poured into a solution of 1.5 gm. (0.005 mol) of 2,6-dipiperidino-5-amino-pyrimidine-carboxylic acid-(4)-amide (M.P. 208–210° C.) in 20 cc. of glacial acetic acid, accompanied by stirring and cooling with ice water. The resulting reaction mixture was allowed to stand for about 2½ hours. 150 cc. of water were added, and the solution was then made alkaline with aqueous 2 N ammonia. A light brown, microcrystalline precipitate separated out. The precipitate was isolated by vacuum filtration, washed with water and dried. 1.1 g.m. (70% of theory) of 2,4-dipiperidino-8-hydroxy-v-triazino-[5,4-d]-pyrimidine.

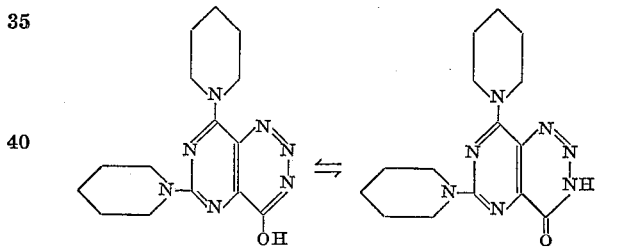

were obtained.

For analysis, the raw product was recrystallized once from ethanol, and was recovered in the form of almost colorless microcrystalline needles having a melting point of 253–255° C.

Analysis ($C_{15}H_{21}N_7O$): Molecular weight 315.4. Calculated: C, 57.12%; H, 6.71%. Found: C, 56.80%; H, 6.80%.

The hydrochloride, obtained by dissolving the free base in ethanol and acidifying the solution with ethanolic hydrochloric acid, occurred as slightly yellow, microcrystalline prisms.

The same free base product was also obtained by reacting 2-chloro-4-piperidino-8-hydroxy-v-triazino-[5,4-d)-pyrimidine with piperidine at elevated temperatures.

Using a procedure analogous to that described above (the reaction may also be carried out in dilute mineral acids), the following additional 2,4-diamino-8-hydroxy-v-triazino-[5,4-d]-pyrimidines were prepared:

(a) 2-piperidino-4-morpholino-8-hydroxy-v - triazino-[5,4-d]-pyrimidine (tautomer: 2-piperidino-4-morpholino-8-oxo-dihydro-v-triazino-[5,4-d] - primidine), M.P. 262–263° C., from sodium nitrite and 2-piperidino-5-amino-6-morpholino-pyrimidine-carboxylic acid-(4)-amide.

(b) 2-diethanolamino-4-(3′-methyl-piperidino)-8 - hydroxy-v-triazino-[5,4-d]-pyrimidine (tautomer: 2 - diethanolamino-4-(3′-methyl-piperidino)-8 - oxo - dihydro - v-triazino-[5,4-d]-pyrimidine], M.P. 290–292° C., from sodium nitrite and 2-diethanolamino-5-amino-6-(3′-methyl-piperidino)-pyrimidine-caboxylc acid-(4)-amide.

(c) 2,4-dipyrrolidino-8-hydroxy-v-triazino-[5,4-d]-pyrimidine (tautomer: 2,4-dipyrrolidino-8-oxo-dihydro-v-triazino-[5,4-d]-pyrimidine), M.P. 295–296° C., from sodium nitrite and 2,6-dipyrrolidino-5-amino-pyrimidine-carboxylic acid-(4)-amide.

(d) 2,4-di-(methyl-ethanolamino)-8-hydroxy-v-triazino-[5,4-d]-pyrimidine [tautomer: 2,4-di-(methyl - ethanolamino)-8-oxo-dihydro-v-triazino-[5,4-d] - pyrimidine], an undistillable oil, from sodium nitrite and 2,6-di-(methyl-ethanolamino)-5-amino-pyrimidine-carboxylic acid - (4)-amide.

(e) 2,4-dipiperidino-7-ethyl-8-oxo-dihydro-v - triazino-[5,4-d]-pyrimidine, M.P. 177–179° C.,

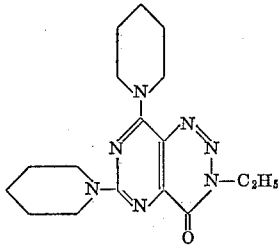

from sodium nitrite and 2,6-dipiperidino-5-amino-pyrimidine-carboxylic acid-(4)-amide, and alkylation of the reaction product with ethyl iodide. The same compound was obtained from sodium nitrite and 2,6-dipiperidino-5-amino-pyrimidine-carboxylic acid-(4)-ethylamide.

(f) 2-(N-methyl-anilino)-4-morpholino-8-hydroxy - v-triazino-[5,4-d]-pyrimidine (tautomer: 2 - (N - methyl-anilino)-4-morpholino-8-oxo-dihydro-v-triazino - [5,4-d]-pyrimidine), M.P. 210–211° C., from sodium nitrite and 2-(N-methyl-anilino)-4-morpholino-5-amino - pyrimidine-carboxylic acid-(4)-amide.

(g) 2-piperidino-4-morpholino-7-ethyl-8-oxo - dihydro-v-triazino-[5,4-d]-pyrimidine, M.P. 207–209° C.,

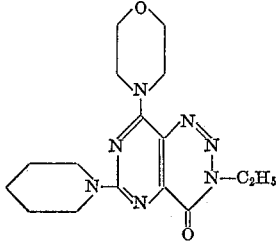

from sodium nitrite and 2-piperidino-5-amino-6-morpholino-pyrimidine-carboxylic acid-(4)-amide, and alkylation of the reaction product with ethyl iodide.

(h) 2,4-dipiperidino-7-methyl-8-oxo-dihydro-v-triazino-[5,4-d]-pyrimidine, M.P. 202–204° C.,

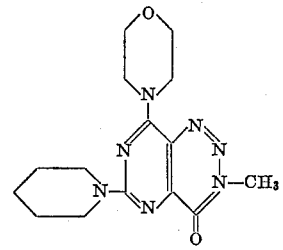

from sodium nitrite and 2,6-dipiperidino-5-amino-pyrimidine-carboxylic acid-(4)-amide, and alkylation of the reaction product with dimethyl sulfate.

EXAMPLE 3

*2-chloro-4-piperidino-8-hydroxy-v-triazino-[5,4-d]-pyrimidine*

A solution of 0.55 gm. (0.008 mol) of sodium nitrite in about 1 cc. of water was poured into a solution of 0.1 gm. (0.004 mol) of 2-chloro-5-amino-6-piperidino-pyrimidine-carboxylic acid-(4)-amide (M.P. 168–170° C.) in 15 cc. of dilute hydrochloric acid, accompanied by stirring and cooling with ice water. The reaction mixture was then allowed to stand for several hours. Thereafter, 60 cc. of water and 2N aqueous ammonia were added, whereupon a light brown microcrystalline precipitate separated out, which was identified to be raw 2-chloro-4-piperidino-8-hydroxy-v-triazino-[5,4-d]-pyrimidine.

For analysis, the raw product was reprecipitated once from about 1 N hydrochloric acid with dilute ammonia. It was obtained in the form of brown microcrystalline needles having a melting point of 227–228° C.

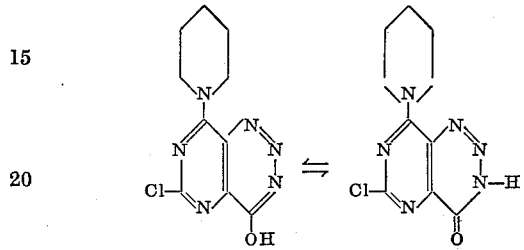

Analysis ($C_{10}H_{11}ClN_6O$): Molecular weight 266.7. Calculated: C, 45.04%; H, 4.16%. Found: C, 45.25%; H, 4.37%.

EXAMPLE 4

*2,4,8-trimorpholino-v-triazino-[5,4-d]-pyrimidine*

A mixture of 1.0 gm. (0.003 mol) of 2,4-dimorpholino-8-chloro-v-triazino-[5,4-d]-pyrimidine M.P. 179–180° C., decomposition), 1.5 cc. of morpholine and 25 cc. of dioxane was refluxed for about 30 minutes. Thereafter, the dioxane was evaporated in vacuo, and the residue was taken up in water. A yellow precipitate formed, which was separated by filtration and dried, yielding 0.9 gm. (77% of theory) of raw 2,4,8-trimorpholino-v-triazino-[5,4-d]-pyrimidine.

For analysis, the raw product was reprecipitated once from 0.5 N hydrochloric acid with ammonia. The pure product was a pale yellow microcrystalline powder having a melting point of 225–226° C.

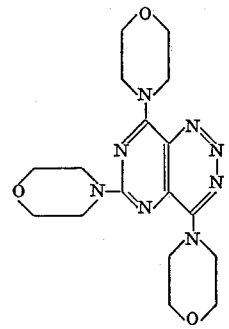

Analysis ($C_{17}H_{24}N_8O_3$): Molecular weight 388.4. Calculated: C, 52.56%; H, 6.22%. Found: C, 52.75% H, 6.43%.

Using a procedure analogous to that described above, the following additional 2,4,8-tribasic-v-triazino-[5,4-d]-pyrimidines were prepared; wherever required, the reflux step was carried out under elevated pressure.

(a) 2,4,8 - tri - (methyl-ethanol-amino)-v-triazino-[5,4-d]-pyrimidine, a viscous non-distillable oil,

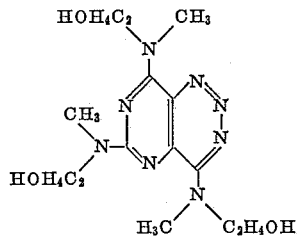

from 2,4-di-(methyl-ethanol-amino)-8-chloro-v-triazino-[5,4-d]-pyrimidine and methyl-ethanol-amine.

(b) 2,4-dimorpholino - 8 - anilino-v-triazino-[5,4-d]-pyrimidine, M.P. 232–234° C.,

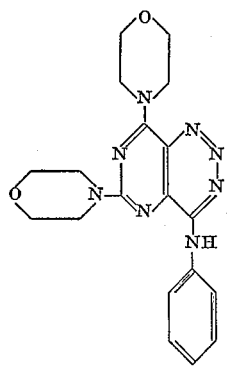

from 2,4-dimorpholino-8-chloro-v-triazino-[5,4-d]-pyrimidine and aniline.

(c) 2,4-dimorpholino - 8 - benzylamino-v-triazino-[5,4-d]-pyrimidine, M.P. 221–222° C.

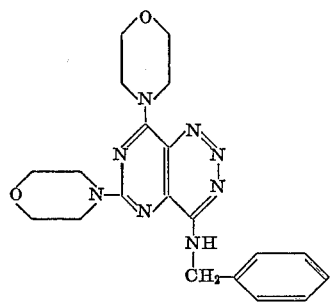

from 2,4-dimorpholino-8-chloro-v-triazino-[5,4-d]-pyrimidine and benzylamine.

(d) 2,4-dipiperidino-8-(β-hydroxyethyl-amino)-v-triazino-[5,4-d]-pyrimidine, M.P. 216–219° C.,

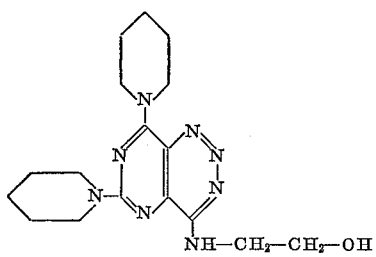

from 2,4-dipiperidino-8-chloro-v-triazino-[5,4-d]-pyrimidine and β-hydroxy-ethylamine.

(e) 2,4-dimorpholino-8-amino-v-triazino - [5,4-d]-pyrimidine, M.P. 332–334° C. (decomposition),

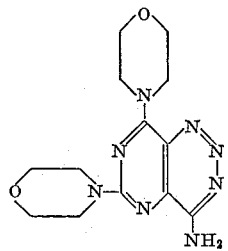

from 2,4-dimorpholino-8-chloro-v-triazino-[5,4-d]-pyrimidine and ammonia.

(f) 2,4 - dimorpholino-8-(isopropyl-amino)-v-triazino-[5,4-d]-pyrimidine, M.P. 223–225° C.,

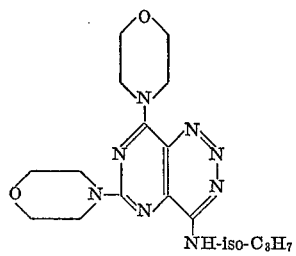

from 2,4-dimorpholino-8-chloro-v-triazino-[5,4-d]-pyrimidine and isopropylamine.

(g) 2,4,8 - tri - (hexamethyleneimino) - v - triazino-[5,4-d]-pyrimidine, M.P. 146–147° C.,

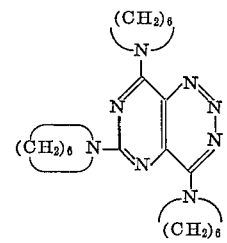

from 2,4 - di-(hexamethyleneimino)-8-chloro-v-triazino-[5,4-d]-pyrimidine and hexamethyleneimine.

(h) 2,4-dipyrrolidino-8-(N',N' - dimethyl - hydrazino)-v-triazino-[5,4-d]-pyrimidine, M.P. 189–191° C.,

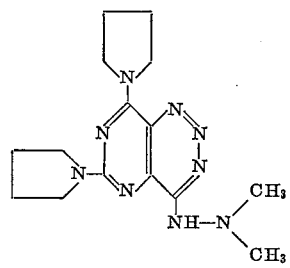

from 2,4-dipyrrolidino-8-chloro-v-triazino-[5,4-d]-pyrimidine and N,N-dimethyl-hydrazine.

(i) 2,4,8 - tripiperidino-v-triazino-[5,4-d]-pyrimidine, M.P. 145–147° C.,

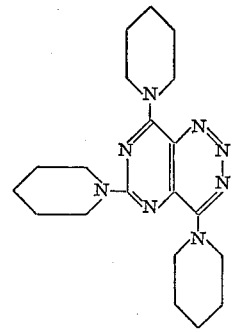

from 2,4-dipiperidino-8-chloro-v-triazino-[5,4-d]-pyrimidine and piperidine.

(j) 2,4-dimorpholino - 8 - (methyl-ethanol-amino)-v-triazino-[5,4-d]-pyrimidine, M.P. 197–198° C.,

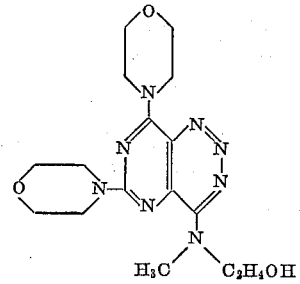

from 2,4-dimorpholino-8-chloro-v-triazino-[5,4-d]-pyrimidine and methyl-ethanolamine.

(k) 2,4-dimorpholino - 8 - diethanolamino-v-triazino-[5,4-d]-pyrimidine, M.P. 185–187° C.,

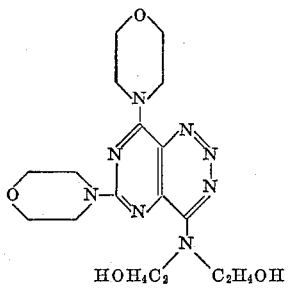

from 2,4-dimorpholino-8-chloro-v-triazino-[5,4-d]-pyrimidine and diethanol-amine.

(l) 2,4-dimorpholino - 8 - (2',3'-dihydroxy-n-propylamino)-v-triazino-[5,4-d]-pyrimidine, M.P. 234–236° C.,

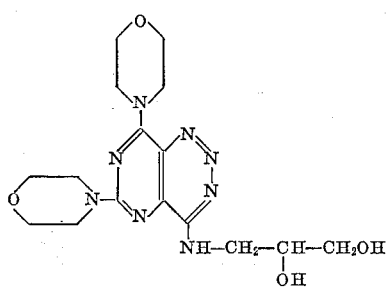

from 2,4-dimorpholino-8-chloro-v-triazino-[5,4-d]-pyrimidine and 2,3-dihydroxy-n-propylamine.

(m) 2,4-dimorpholino - 8 - (N'-methyl-piperazino)-v-triazino-[5,4-d]-pyrimidine, M.P. 145–147° C.,

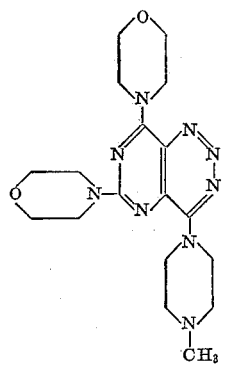

from 2,4 - dimorpholino - 8 - chloro - v - triazino - [5,4-d]-pyrimidine and N-methyl-piperazine.

(n) 2,4 - dimorpholino - 8 - (1',2',5',6' - tetrahydropyridino) - v - triazino - [5,4-d] - pyrimidine, M.P. 205–206° C.,

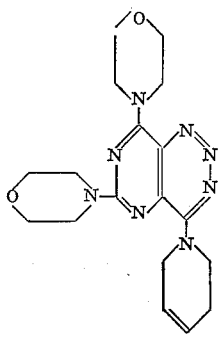

from 2,4 - dimorpholino - 8 - chloro - v - triazino - [5, 4-d]-pyrimidine and 1,2,5,6-tetrahydro-pyridine.

(o) 2,4 - dipyrrolidino - 8 - (2' - methyl-morpholino)-v-triazino-[5,4-d]-pyrimidine, M.P. 145–147° C.,

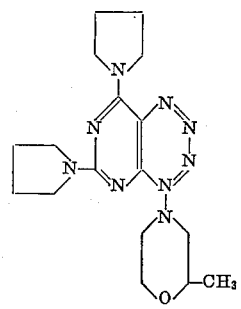

from 2,4 - dipyrrolidino - 8 - chloro - v - triazino - [5, 4-d]-pyrimidine and 2-methyl-morpholine.

(p) 2,4 - dimorpholino - 8 - allylamino - v - triazino-[5,4-d]-pyrimidine, M.P. 177–179° C.,

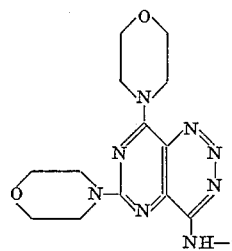

from 2,4 - dimorpholino - 8 - chloro - v - triazino - [5, 4-d]-pyrimidine and allylamine.

(q) 2,4 - dipyrrolidino - 8 - (3' - hydroxy-piperidino)-v-triazino-[5,4-d]-pyrimidine, M.P. 208–209° C.,

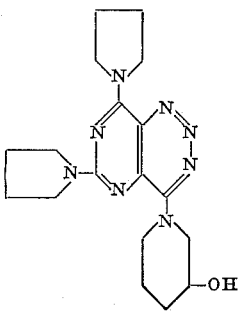

from 2,4 - dipyrrolidino - 8 - chloro - v - triazino - [5, 4-d]-pyrimidine and 3-hydroxy-piperidine.

(r) 2,4 - dipyrrolidino - 8 - ethylamino - v - triazino-[5,4-d]-pyrimidine, M.P. 202–204° C.,

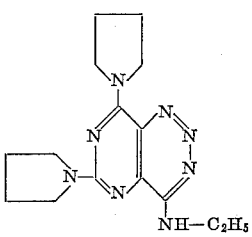

from 2,4 - dipyrrolidino - 8 - chloro - v - triazino - [5, 4-d]-pyrimidine and ethylamine.

EXAMPLE 5

*2,4,8-trihydroxy-v-triazino-[5,4-d]-pyrimidine*

8.5 gm. (0.05 mol) of 2,6-dihydroxy-5-amino-pyrimidine-carboxylic acid-(4)-amide were added to about 500 cc. of concentrated hydrochloric acid, and then, while cooling with ice, 5.5 gm. (0.08 mol) of sodium nitrite were slowly stirred in. An almost colorless precipitate began to separate out immediately. The liquid mixture was diluted with water to twice its volume, and the precipitate was separated by vacuum filtration, washed and dried. 7.3 gm. (81% of theory) of raw 2,4,8-trihydroxy-v-triazino-[5,4-d]-pyrimidine

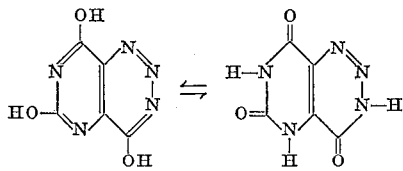

were obtained.

For analysis, the raw product was reprecipitated once from very dilute ammonia with hydrochloric acid; almost colorless, microcrystalline, mostly star-shaped prisms. No melting point could be observed up to 350° C., and the compound underwent dark discoloration beginning at about 220° C.

Analysis ($C_5H_3N_5O_3$): Molecular weight 181.1. Calculated: N, 38.67%. Found: N, 38.70%.

The ammonia salt of the product was obtained by dissolving 2,4,8 - trihydroxy - v - triazino - [5,4-d]-pyrimidine in hot dilute ammonia and cooling the solution. The salt occurred in the form of very fine, almost colorless needles. It turned very dark upon being heated to a temperature above about 250° C.

The sodium salt and the potassium salt were obtained by dissolving 2,4,8-trihydroxy-v-triazino-[5,4-d]-pyrimidine in dilute aqueous sodium hydroxide and potassium hydroxide, respectively, and adding ethanol to these solutions. The potassium salt occurred as very fine colorless fibers, and the sodium salt as very small colorless needles. Neither of these salts exhibited a melting point when heated up to a temperature of 350° C.

EXAMPLE 6

*2,4,8-trioxo-7-n-propyl-hexahydro-v-triazino-[5,4-d]-pyrimidine*

2.1 gm. (0.03 mol) of sodium nitrite were added slowly to a solution of 5.2 gm. (0.025 mol) of 2,6-dihydroxy-5 - amino - pyrimidine - carboxylic acid - (4) - n - propylamide (M.P. 290–292° C.) in about 50 cc. of concentrated hydrochloric acid, while cooling with ice (at about 5° C.). The reaction mixture was allowed to stand for about one hour and was then poured into 500 cc. of water, whereupon a colorless, crystalline precipitate separated out. The precipitate was separated by vacuum filtration, washed and dried. 3.9 gm. (65% of theory) of raw 2,4,8-trioxo-7-n-propyl-hexahydro-v-triazino-[5,4-d]-pyrimidine

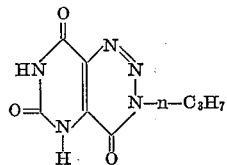

were obtained.

For analysis, the raw product was reprecipitated once from solution in 0.5 N potassium hydroxide by adding 2 N hydrochloric acid thereto; colorless, microcrystalline powder having a melting point of 240–241° C.

Analysis ($C_8H_9N_5O_3$): Molecular weight 223.2. Calculated: C, 43.05%; H, 4.07%. Found: C, 43.00%; H, 4.42%.

EXAMPLE 7

*2,4,8-trioxo-7-ethyl-hexahydro-v-triazino-[5,4-d]-pyrimidine*

2.1 gm. (0.03 mol) of sodium nitrite were slowly added to a solution of 4.0 gm. (0.02 mol) of 2,6-dihydroxy-5-amino-pyrimidine-carboxylic acid-(4)-ethylamide (M.P. 293–295° C.) in 50 cc. of concentrated sulfuric acid, while cooling with ice. The reaction mixture was allowed to stand for about one hour and then ice was added thereto, whereupon a colorless, crystalline precipitate separated out. The precipitate was separated by vacuum filtration, washed and dried. 1.9 gm. (45% of theory) of raw 2,4,8-trioxo-7-ethylhexahydro-v-triazino-[5,4-d]-pyrimidine

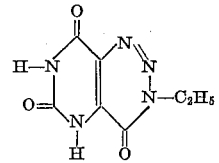

were obtained.

For analysis, the raw product was reprecipitated once from solution in 0.5 N potassium hydroxide by adding 2 N hydrochloric acid thereto; colorless, microcrystalline powder having a melting point of 254–256° C.

Analysis ($C_7H_7N_5O_3$): Molecular weight 209.2. Calculated: C, 40.20%; H, 3.37%. Found: C, 40.20%; H, 3.15%.

Using a procedure analogous to that described above, the following additional 2,4,8-trioxo-hexahydro-v-triazino-[5,4-d]-pyrimidine derivatives were prepared:

(a) 2,4,8 - trioxo - 7 - benzyl - hexahydro - v - triazino-[5,4-d]-pyrimidine, M.P. 243–245° C.,

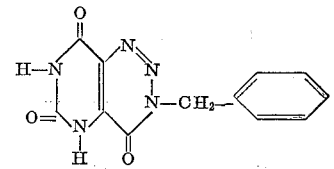

from sodium nitrite and 2,6-dihydroxy-5-amino-pyrimidine-carboxylic acid-(4)-benzylamide.

(b) 2,4,8 - trioxo - 7 - allyl - v - triazino - [5,4-d]-pyrimidine, M.P. 231–233° C.,

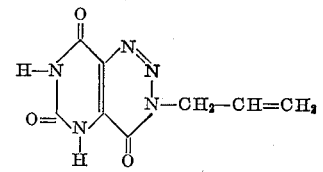

from sodium nitrite and 2,6-dihydroxy-5-amino-pyrimidine-carboxylic acid-(4)-allylamide.

(c) 2,4,8-trioxo-7-phenyl-hexahydro-v-triazino-[5,4-d]-pyrimidine

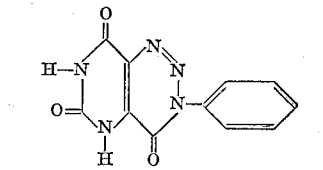

from sodium nitrite and 2,6-dihydroxy-5-amino-pyrimidine-carboxylic acid-(4)-phenylamide.

(d) 2,4,8 - trioxo-7-(γ-methoxy-n-propyl)-hexahydro-v-triazino-[5,4-d]-pyrimidine, M.P. 210–211° C. (decomposition),

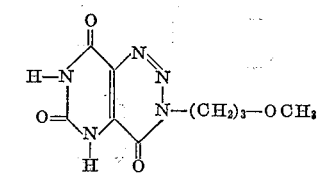

from sodium nitrite and 2,6-dihydroxy-5-amino-pyrimidine-carboxylic acid-(4)-(γ-methoxy-n-propyl)-amide.

(e) 2,4,8-trioxo-7-isoamyl-hexahydro-v-triazino-[5,4-d]-pyrimidine, M.P. 238–239° C. (decomposition),

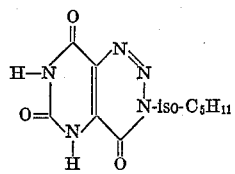

from sodium nitrite and 2,6-dihydroxy-5-amino-pyrimidine-carboxylic acid-(4)-isoamylamide.

(f) 2,4,8-trioxo - 7 - (β-hydroxy-ethyl)-hexahydro-v-triazino-[5,4-d]-pyrimidine, M.P. 236–237° C. (decomposition),

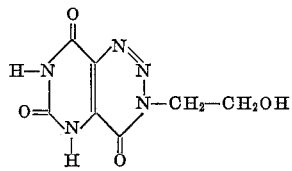

from sodium nitrite and 2,6-dihydroxy-5-amino-pyrimidine-carboxylic acid-(4)-(β-hydroxy-ethyl)-amide.

EXAMPLE 8

*1,3,7-tribenzyl-2,4,8-trioxo-hexahydro-v-triazino-[5,4-d]-pyrimidine*

14 cc. (0.1 mol) of benzyl chloride were added to a solution of 1.8 gm. (0.01 mol) of 2,4,8-trihydroxy-v-triazino-[5,4-d]-pyrimidine in about 100 cc. of very dilute potassium hydroxide. Thereafter, the reaction mixture was heated for about 1¼ hours at 90° to 95° C., accompanied by vigorous stirring. During this time the pH was maintained above 9 by dropwise addition of 2 N potassium hydroxide. The reaction product separated out in the form of a viscous, slimy mass. The reaction mixture was allowed to stand for some time to permit the precipitate to collect at the bottom, and then the supernatant aqueous solution was decanted and discarded. The residue was then dissolved in a little acetone, a small amount of methanol was added to the acetone solution, and the mixture was allowed to stand for about two hours, during which time the raw reaction product separated out in the form of a colorless, microcrystalline precipitate. The precipitate was recrystallized once from ethanol, whereupon it was obtained in the form of fine, colorless, microcrystalline needles having a melting point of 166–168° C. The product was identified to be 1,3,7-tribenzyl-2,4,8-trioxo-hexahydro-v-triazino-[5,4-d]-pyrimidine:

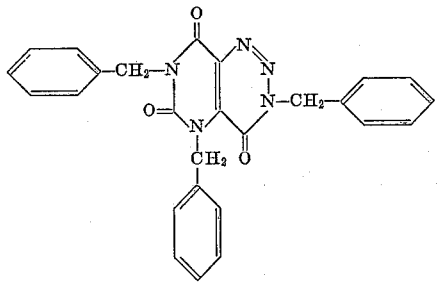

EXAMPLE 9

*2-(N-methyl-anilino)-4-phenylmercapto-8-hydroxy-v-triazino-[5,4-d]-pyrimidine*

A solution of 0.3 gm. (about 0.004 mol) of sodium nitrite in 3 cc. of water was slowly poured into a solution of 0.7 gm. (0.002 mol) of 2-(N-methyl-anilino)-5-amino-6-phenylmercapto-pyrimidine-carboxylic acid-(4)-amide (M.P. 168–169° C.) in 30 cc. of glacial acetic acid and several drops of concentrated hydrochloric acid. The resulting reaction mixture was allowed to stand for several hours, and then 200–250 cc. of water were added. Thereafter, the mixture was neutralized with concentrated ammonia, whereupon a slightly gray, flaky precipitate formed. The precipitate was separated by filtration, yielding 0.65 gm. (90% of theory) of raw 2-(N-methyl-anilino)-4-phenyl-mercapto-8-hydroxy-v-triazino-[5,4-d]-pyrimidine

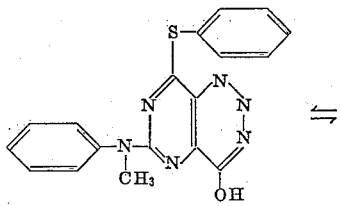

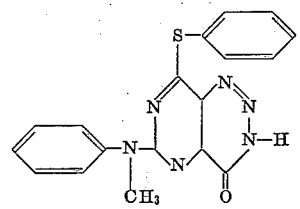

The raw product was recrystallized twice from ethanol, whereupon it was obtained in the form of brownish hexagonal platelets having a melting point of 230–231° C. (decomposition).

Analysis (C$_{18}$H$_{14}$N$_6$OS): Molecular weight 362.4. Calculated: C, 59.65%; H, 3.89%. Found: C, 60.10%; H, 3.68%.

The same compound was obtained by refluxing 2-(N-methyl-anilino) - 4 - chloro-8-hydroxy-v-triazino-[5,4-d]-pyrimidine with thiophenol and pyridine in dioxane.

Using a procedure analogous to that described above, the following 2 - mercapto-4-amino-8-hydroxy-v-triazino-[5,4-d]-pyrimidines were prepared:

(a) 2 - benzylmercapto - 4 - piperidino-8-hydroxy-v-triazino-[5,4-d]-pyrimidine, M.P. 166–168° C.,

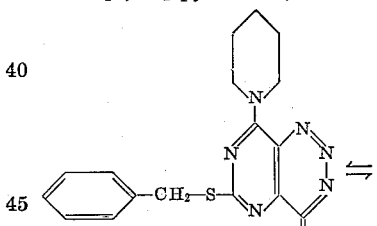

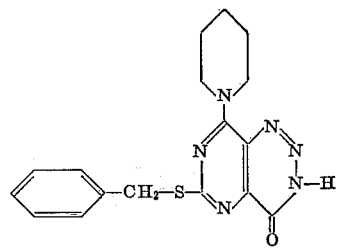

from sodium nitrite and 2-benzylmercapto 5-amino-6-piperidino-pyrimidine-carboxylic acid-(4)-amide.

(b) 2-ethylmercapto-4-(N-methyl-anilino)-8-hydroxy-v-triazino-[5,4-d]-pyrimidine, M.P. 215–217° C.,

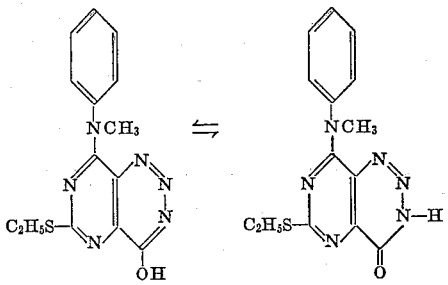

from sodium nitrite and 2-ethylmercapto-5-amino-6-(N-methyl-anilino)-pyrimidine-carboxylic acid-(4)-amide.

EXAMPLE 10

*2-ethoxy-4-piperidino-8-hydroxy-v-triazino[5,4-d]-pyrimidine*

2.7 gm. (0.01 mol) of 2-chloro-4-piperidino-8-hydroxy-v-triazino-[5,4-d]-pyrimidine were refluxed for one hour with a solution of 1 gm. (about 0.04 mol) of sodium in 100 cc. of ethanol. Thereafter, about 150 cc. of water were added to the reaction mixture, and the aqueous solution was neutralized with glacial acetic acid. A brown, crystalline precipitate formed, which was separated by filtration. 2.1 gm. (76% of theory) of raw 2-ethoxy-4-piperidino-8-hydroxy-v-triazino-[5,4-d]-pyrimidine

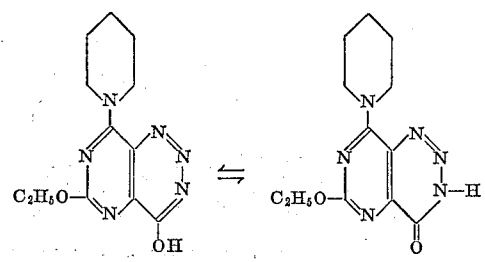

were obtained. The raw product was recrystallized from a large volume of a mixture of benzene and cyclohexane (1:1), whereupon the product was obtained in the form of ivory-colored, microcrystalline prisms having a melting point of 224–225° C.

Analysis ($C_{12}H_{16}N_6O_2$): Molecular weight 276.3. Calculated: C, 52.16%; H, 5.84%. Found: C, 52.40%; H, 6.11%.

Using a procedure analogous to that described above, the following additional 2-amino-4-oxy- and 2-oxy-4-amino-8-hydroxy-v-triazino-[5,4-d]-pyrimidines were prepared:

(a) 4 - ethoxy - 2 - (N-methyl-anilino)-8-hydroxy-v-triazino-[5,4-d]-pyrimidine, M.P. 147–149° C.,

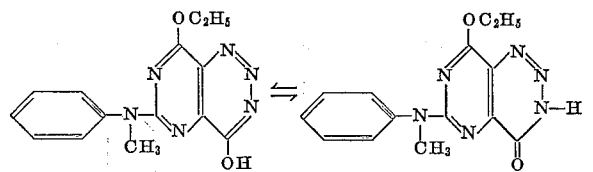

from 2-(N-methyl-anilino)-4-chloro-8-hydroxy-v-triazino-[5,4-d]-pyrimidine, sodium and ethanol.

(b) 2 - phenoxy - 4 - piperidino-8-hydroxy-v-triazino-[5,4-d]-pyrimidine, M.P. 227–228° C.,

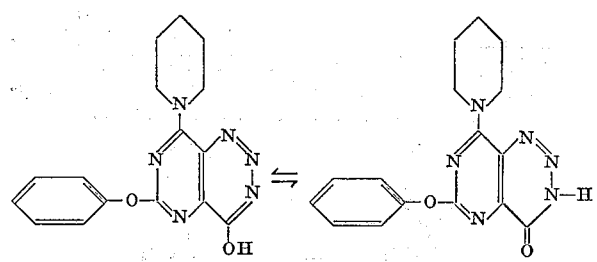

from 2 - chloro-4-piperidino-8-hydroxy-v-triazino-[5,4-d]-pyrimidine, sodium and phenol.

EXAMPLE 11

Using a procedure analogous to that described in Example 10, 2-(β-diethylamino-ethoxy)-4-(N-methyl-anilino)-8 - hydroxy - v - triazino-[5,4-d]-pyrimidine, M.P. 206–207° C.,

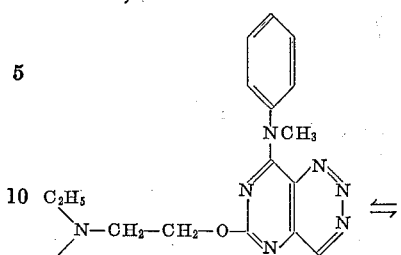

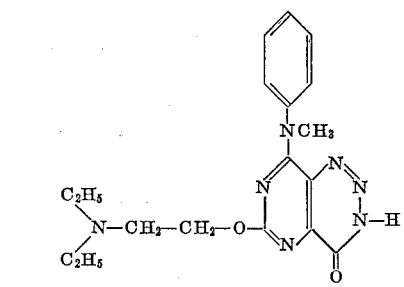

EXAMPLE 12

*2,4-dimorpholino-8-phenylmercapto-v-triazino-[5,4-d]-pyrimidine*

A suspension of 1.0 gm. (0.003 mol) of 2,4-dimorpholino-8-chloro-v-triazino-[5,4-d]-pyrimidine in 30–50 cc. of dioxane was admixed with 0.7 gm. (0.005 mol) of sodium thiophenolate, and the resulting mixture was refluxed for one hour. Thereafter, the reaction mixture was taken up in water. The sodium chloride, which had precipitated out during refluxing, dissolved, and a yellow, crystalline precipitate formed. The yellow precipitate was separated, yielding 0.9 gm. (73% of theory) of raw 2,4-dimorpholino-8-phenylmercapto-v-triazino-[5,4-d]-pyrimidine

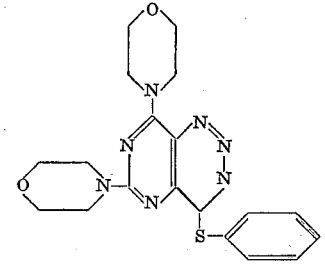

For analysis, the raw product was reprecipitated twice, once from ethanol and once from dioxane, by adding water to the respective solutions, whereupon the product was obtained in the form of a light yellow, microcrystalline powder (prisms or needles) having a melting point of 235–236° C.

Analysis ($C_{19}H_{21}N_7O_2S$): Molecular weight 411.5. Calculated: C, 55.46%; H, 5.14%; N, 23.83%; S, 7.79%. Found: C, 55.50%; H, 5.30%; N, 23.30%; S, 7.42%.

Using a procedure analogous to that described above, the following additional 8-mercapto- and 8-oxy-substituted 2,4-dimorpholino- or 2,4-dipiperidino-v-triazino-[5,4-d]-pyrimidines were prepared:

(a) 2,4 - dimorpholino - 8 - ethylmercapto - v-triazino-[5,4-d]-pyrimidine, M.P. 237–239° C.,

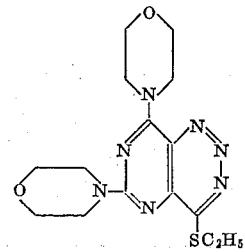

from 2,4-dimorpholino-8-chloro-v-triazino-[5,4-d]-pyrimidine and sodium ethylmercaptide.

(b) 2,4 - dimorpholino - 8 - benzylmercapto-v-triazino-[5,4-d]-pyrimidine, M.P. 268–269° C.,

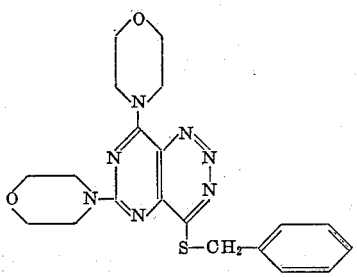

from 2,4-dimorpholino-8-chloro-v-triazino-[5,4-d]-pyrimidine and sodium benzylmarcaptide.

(c) 2,4 - dimorpholino - 8 - mercapto-v-triazino-[5,4-d]-pyrimidine, M.P. 249–253° C.,

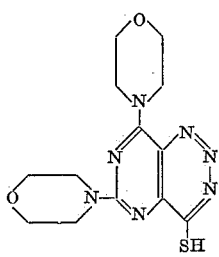

from 2,4-dimorpholino - 8 - chloro-v-triazino-[5,4-d]-pyrimidine and sodium sulfhydrate.

(d) 2,4 - dimorpholino - 8 - ethoxy-v-triazino-[5,4-d]-pyrimidine, M.P. 257–258° C.,

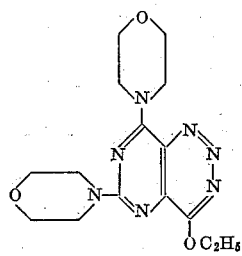

from 2,4-dimorpholino-8-chloro-v-triazino-[5,4-d]-pyrimidine and sodium ethylate.

(e) 2,4 - dipiperidino - 8 - phenoxy - v-triazino-[5,4-d]-pyrimidine, M.P. 242–243° C.,

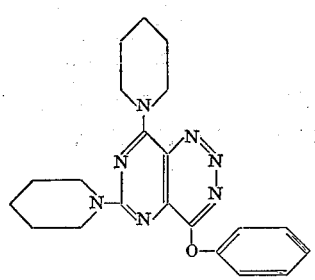

from 2,4-dipiperidino-8-chloro-v-triazino-[5,4-d]-pyrimidine and sodium phenolate.

EXAMPLE 13

Using a procedure analogous to that described in Example 1, 4-piperidino-8-hydroxy-v-triazino-[5,4-d]-pyrimidine

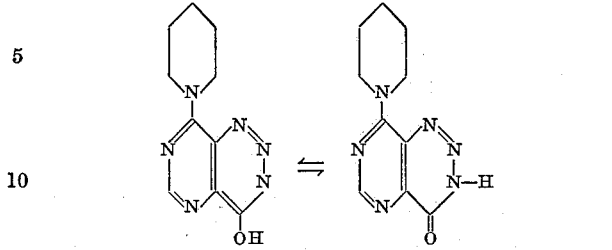

was prepared from 5-amino-6-piperidino-pyrimidine-carboxylic acid-(4)-amide and sodium nitrite. The raw prodduct was reprecipitated once from dilute hydrochloric acid by adding ammonia to the acid solution. The purified product was a virtually colorless, microcrystalline powder having a melting point of 273–274° C. Yield: 86% of theory.

EXAPLE 14

Using a procedure analogous to that described in Example 4, the following 1,3-dimethyl-2,4-dioxo-8-(subst. amino)-v-triazino-[5,4-d]-pyrimidines were prepared:

(a) 1,3 - dimethyl - 2,4 - dioxo-8-morpholino-tetrahydro-v-triazino-[5,4-d]-pyrimidine, M.P. 267–268° C. (decomposition),

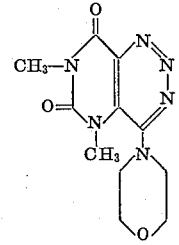

from 1,3-dimethyl-2,4-dioxo-8-chloro-tetrahydro-v-triazino-[5,4-d]-pyrimidine and morpholine.

(b) 1,3 - dimethyl - 2,4 - dioxo - 8 - piperidino-tetrahydro-v-triazino-[5,4-d]-pyrimidine, M.P. 221–222° C.,

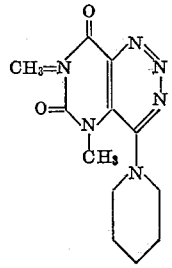

from 1,3-dimethyl-2,4-dioxo-8-chloro - tetrahydro-v-triazino-[5,4-d]-pyrimidine and piperidine.

(c) 1,3-dimethyl-2,4-dioxo-8-anilino - tetrahydro-v-triazino-[5-4-d]-pyrimidine, which decomposes beginning at 235° C.,

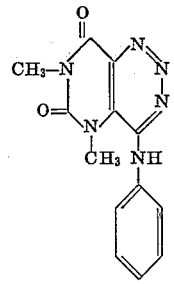

from 1,3-dimethyl-2,4-dioxo-8-chloro - tetrahydro-v-triazino-[5,4-d]-pyrimidine and aniline.

(d) 1,3-dimethyl-2,4-dioxo-8-benzylamino-tetrahydrov-triazino-[5,4-d]-pyrimidine, M.P. 178–180° C. (decomposition), from 1,3-dimethyl-2,4-dioxo-8-chloro - tetrahydro-v-triazino-[5,4-d]-pyrimidine and benzylamine.

(e) 1,3-dimethyl-2,4-dioxo-8-diethylamino-tetrahydro-v-triazino-[5,4-d]-pyrimidine, M.P. 171–172° C., from 1,3-dimethyl-2,4-dioxo-8-chloro - tetrahydro-v-triazino-[5,4-d]-pyrimidine and diethylamine.

The compounds according to the present invention, that is, the v-triazino-[5,4-d]-pyrimidines, their tautomers, the salts of said v-triazino-[5,4-d]-pyrimidines and the salts of said tautomers, possess useful pharmacological properties. More particularly, they exhibit cardiovascular, spasmolytic and diuretic activities and have a desirable effect upon the central nervous system.

While I have illustrated my invention with the aid of certain specific embodiments, it will be apparent to those skilled in the art that the invention is not limited to these particular embodiments and that various changes and modifications may be made without departing from the spirit of the invention or the scope of the appended claims.

I claim:
1. A compound selected from the group consisting of v-triazino-[5,4-d]-pyrimidiness of the formula wherein
$R_1$, $R_2$ and $R_3$ are each selected from the group consisting of hydrogen, hydroxy, halogen, lower alkoxy, (di-lower alkyl-amino)-lower alkoxy, phenoxy, mercapto, lower alkyl-mercapto, benzyl-mercapto, phenyl-mercapto, lower alkyl-hydrazino and basic substituents of the formula wherein
$R_4$ and $R_5$ are each selected from the group consisting of hydrogen, lower alkyl, lower alkenyl, hydroxy-lower alkyl, phenyl, benzyl, and, together with each other and the adjacent nitrogen atom, basic heterocycles selected from the group consisting of morpholino, lower alkyl-morpholino, pyrrolidino, piperidino, lower alkyl-piperidino, hydroxy-piperidino, tetrahydropyridino, hexamethylene-imino and N'-lower alkyl-piperazino, their tautomers of the formula wherein
$R_8$ is selected from the group consisting of hydrogen, lower alkyl, lower alkoxy-lower alkyl, lower alkenyl, benzyl and phenyl, and
$R_{11}$ and $R_{12}$ are each selected from the group consisting of hydrogen, halogen, lower alkoxy, (di-lower alkyl-amino)-lower alkoxy, phenoxy, mercapto, lower alkyl-mercapto, benzyl-mercapto, phenyl-mercapto, lower alkyl-hydrazino and wherein $R_4$ and $R_5$ have the meanings defined above, pharmaceutically acceptable acid addition salts of said v-triazino-[5,4-d]-pyrimidines, pharmaceutically acceptable alkali metal salts of said v-triazino-[5,4-d]-pyrimidines, pharmaceutically acceptable acid addition salts of said tautomers and pharmaceutically acceptable alkali metal salts of said tautomers.

2. 2,4 - dimorpholino-8-hydroxy-v-triazino - [5,4-d]-pyrimidine.
3. 2-diethanolamino-4 - (3'-methylpiperidino) - 8-hydroxy-v-triazino-[5,4-d]-pyrimidine.
4. 2-morpholino-4-piperidino - 7-ethyl-8-oxodihydro-v-triazino-[5,4-d]-pyrimidine.
5. 2-piperidino-4-morpholino-7-ethyl - 8 - oxo-dihydro-v-triazino-[5,4-d]-pyrimidine.
6. 2,4-dipiperidino-7-ethyl - 8 - oxo-dihydro-v-triazino-[5,4-d]-pyrimidine.
7. 2,4 - dipiperidino-7-propyl - 8 - oxo-dihydro-v-triazino-[5,4-d]-pyrimidine.
8. 2,4,8-trimorpholino-v-triazino-[5,4-d]-pyrimidine.
9. 2,4-dimorpholino-8-allylamino - v - triazino-[5,4-d]-pyrimidine.
10. 2,4-dimorpholino-8-isopropylamino - v - triazino-[5,4-d]-pyrimidine.
11. 2,4-dipyrrolidino-8 - (2'-methylmorpholino) - v-triazino-[5,4-d]-pyrimidine.

References Cited by the Examiner
UNITED STATES PATENTS

| 3,056,782 | 10/62 | Papesch | 270—249.5 |
| 3,056,783 | 10/62 | Papesch et al. | 260—249.5 |

WALTER A. MODANCE, *Primary Examiner.*
JOHN D. RANDOLPH, *Examiner.*

UNITED STATES PATENT OFFICE
CERTIFICATE OF CORRECTION

Patent No. 3,213,090            October 19, 1965

Josef Roch

It is hereby certified that error appears in the above numbered patent requiring correction and that the said Letters Patent should read as corrected below.

Column 3, lines 22 to 28, the formula should appear as shown below instead of as in the patent:

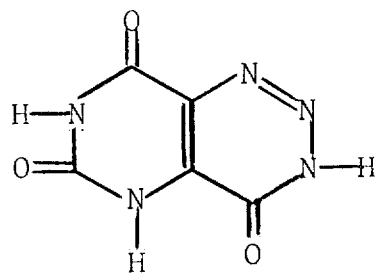

column 5, lines 34 to 42, the formulas should appear as shown below instead of as in the patent:

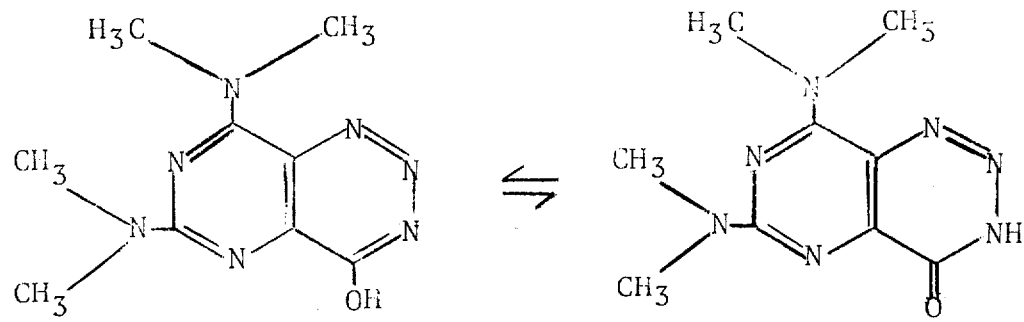

3,213,090 same column 5, lines 62 to 72, for that portion of the formula reading

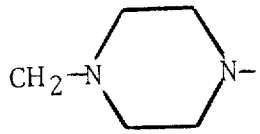    read    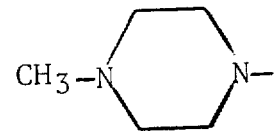

column 6, lines 21 to 40, the formulas should appear as shown below instead of as in the patent:

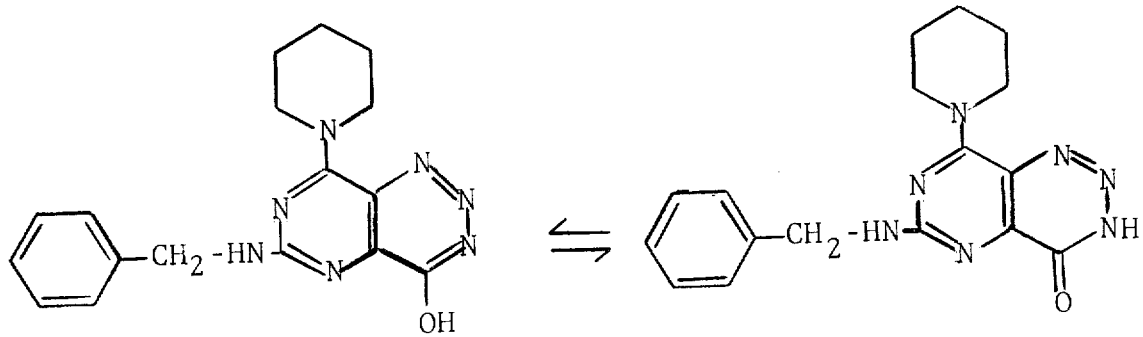

column 7, lines 36 and 54, for "τ-", each occurrence, read -- γ- --; same column 7, line 70, for "nitrate" read -- nitrite --; column 8, line 32, for "g.m." read -- gm. --; line 33, after "-pyrimidine" strike out the period; column 9, lines 54 to 63, for that portion of the formula reading

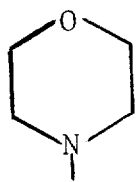    read    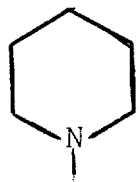

column 10, line 31, before "M.P." insert an opening parenthesis; column 14, lines 20 to 30, the formula should appear as shown below instead of as in the patent:

3,213,090
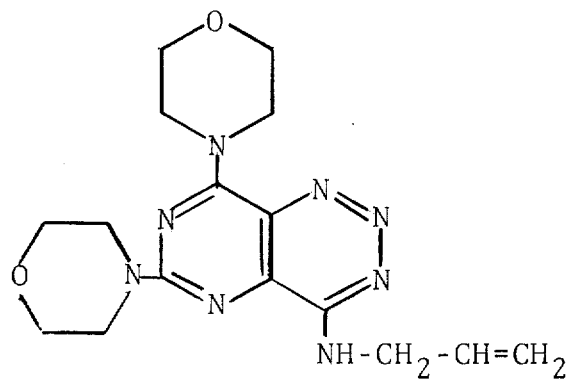
column 18, lines 6 to 22, the formulas should appear as shown below instead of as in the patent:
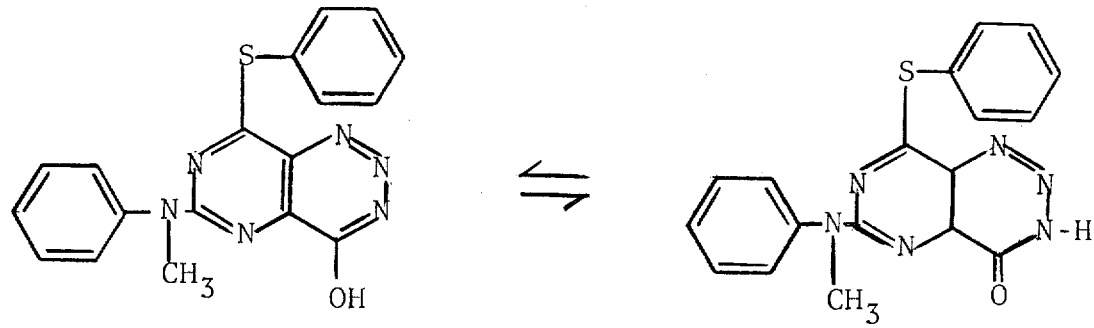
column 21, line 19, for "benzylmarcaptide" read -- benzylmercaptide --; column 22, line 21, for "EXAPLE" read -- EXAMPLE --; same column 22, lines 45 to 55, the formula should appear as shown below instead of as in the patent:
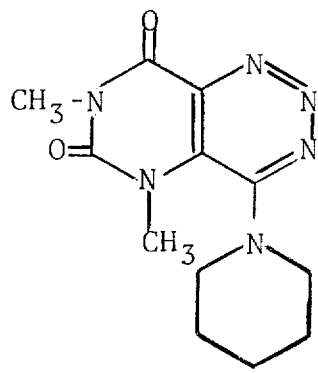

same column 22, lines 61 to 72, the formula should appear as shown below instead of as in the patent:

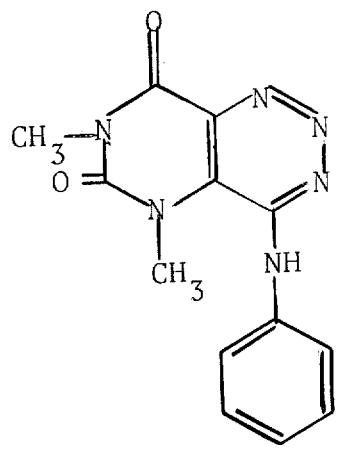

column 24, lines 9 to 14, the formula should appear as shown below instead of as in the patent:

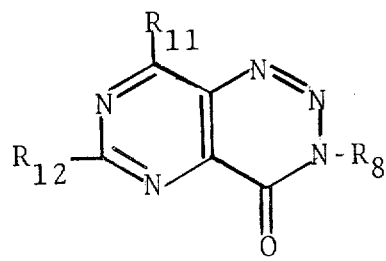

Signed and sealed this 14th day of June 1966.

(SEAL)
Attest:

ERNEST W. SWIDER
Attesting Officer

EDWARD J. BRENNER
Commissioner of Patents